(12) United States Patent
Fox

(10) Patent No.: US 7,868,485 B2
(45) Date of Patent: Jan. 11, 2011

(54) PULSED POWER SUPPLY WITH CURRENT RIPPLE REDUCTION

(75) Inventor: David A. Fox, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 973 days.

(21) Appl. No.: 11/258,263

(22) Filed: Oct. 25, 2005

(65) Prior Publication Data

US 2007/0090693 A1    Apr. 26, 2007

(51) Int. Cl.
    *H03K 3/00* (2006.01)
(52) U.S. Cl. .............................. 307/106; 307/39; 307/41
(58) Field of Classification Search .................... 307/13, 307/11, 106, 39, 41, 31, 32; 363/39, 131; 323/222, 234; 327/181
    See application file for complete search history.

(56) References Cited

U.S. PATENT DOCUMENTS

| | | | | |
|---|---|---|---|---|
| 4,214,171 A | * | 7/1980 | Gyori .......................... | 307/39 |
| 4,574,225 A | | 3/1986 | Pershall et al. | |
| 4,814,963 A | * | 3/1989 | Petersen ....................... | 363/20 |
| 4,972,292 A | * | 11/1990 | Petersen ....................... | 361/56 |
| 5,045,712 A | * | 9/1991 | Baggenstoss ................. | 307/29 |
| 5,274,539 A | | 12/1993 | Steigerwald et al. | |
| 5,377,090 A | | 12/1994 | Steigerwald | |
| 6,295,804 B1 | | 10/2001 | Burton et al. | |
| 6,389,049 B2 | | 5/2002 | Yoshida et al. | |
| 6,788,555 B2 | | 9/2004 | Bourdillon et al. | |
| 7,215,087 B2 | * | 5/2007 | Matsushima ................. | 315/274 |
| 7,295,448 B2 | * | 11/2007 | Zhu ............................. | 363/17 |
| 2002/0125863 A1 | * | 9/2002 | Lin et al. ..................... | 323/234 |
| 2006/0291512 A1 | * | 12/2006 | Borschowa ............... | 372/38.02 |

* cited by examiner

*Primary Examiner*—Jared J Fureman
*Assistant Examiner*—Daniel Cavallari
(74) *Attorney, Agent, or Firm*—Kinney & Lange, P.A.

(57) ABSTRACT

A pulsed power source minimizes current ripple disturbance in a main power supply by dividing the pulsed load into a plurality of pulsed sub-loads. The pulsed power source includes a plurality of pulsed load power supplies, each pulsed load power supply receiving charging power from the main power supply and providing pulsed energy to one of the plurality of pulsed sub-loads. Pulsed energy delivered to each of the plurality of pulsed sub-loads is out of phase with the other pulsed sub-loads, resulting in the input current provided by the main power supply having a reduced current ripple magnitude and increased current ripple frequency.

19 Claims, 7 Drawing Sheets

US 7,868,485 B2

PULSED POWER SUPPLY WITH CURRENT RIPPLE REDUCTION

BACKGROUND OF THE INVENTION

A number of applications require the delivery of high-energy pulses. These types of applications are known generally as pulsed loads. Applications that make use of pulsed power include radar, lasers, rail guns, and pulsed thrusters for space propulsion. In order to generate the high-energy pulse necessary to drive the pulsed load, a typical power supply (e.g., a dc power source) is connected to provide charging power to a pulsed load power supply. The pulsed load power supply stores energy provided by the typical power supply in a large storage device, such as a capacitor. When a pulse of energy is required by the pulsed load, a switch connecting the capacitor to the pulsed load is closed, allowing energy stored in the capacitor to be supplied to the pulsed load.

Oftentimes, applications employing pulsed loads require the "firing" or discharge of energy through the pulsed load at a regular interval or frequency. An example of one such application is a pulsed thruster, under development for use in space propulsion systems. In order to maintain constant propulsion, the pulsed thruster is discharged repeatedly at a set frequency. The amount of energy required by the pulsed thruster results in a large amount of current being drawn from the typical power supply to the pulsed load power supply. In addition, due to the repetitious discharge of energy through the pulsed load, the current drawn from the power supply varies in time in what is known as current ripple. In some instances, current ripple caused by the pulsed load can be filtered using passive filter elements to maintain the power supply at a constant voltage. However, in applications in which the pulsed load is fired at a relatively slow frequency (e.g., 50 Hz), the passive filter elements required to filter the low frequency current ripple become large and expensive. Unfiltered current ripple has the effect of causing modulation in the typical power supply. This can result in large electrical disturbances in other components that are connected and share the same power supply. Therefore, it would be desirable to develop a pulsed load power supply circuit that is capable of providing high-energy pulses to a pulsed load without creating current ripple modulation problems in the power supply.

BRIEF SUMMARY OF THE INVENTION

The present invention is a pulsed power source that provides pulsed power to a load. The pulsed power source includes a plurality of pulsed load power supplies, each pulsed load power supply connected to receive charging power from a main power supply and to provide pulsed power to one of a plurality of sub-loads forming the load. Pulsed power is supplied to each sub-load at a different phase with respect to pulsed power delivered other sub-loads.

DETAILED DESCRIPTION

Figure 1:
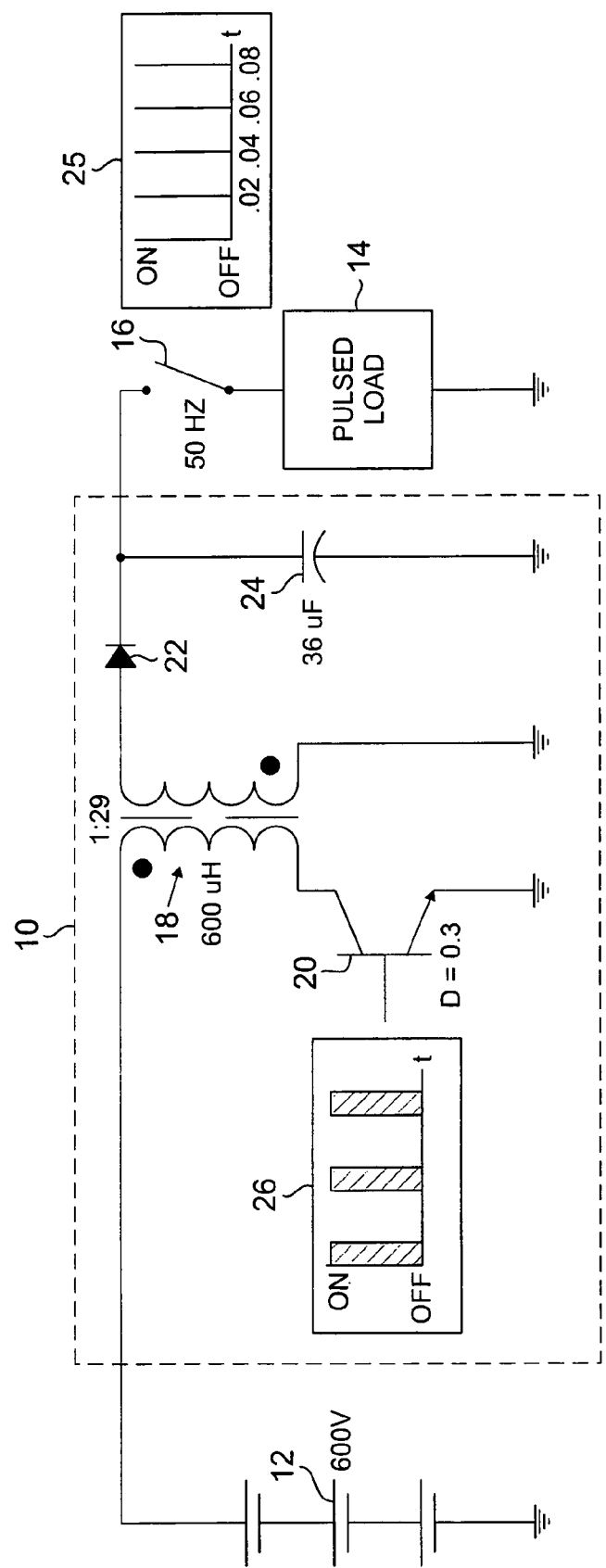
FIG. 1 is a circuit diagram of a pulsed load power supply as known in the prior art.

FIG. 1 shows a typical pulsed load power supply 10 connected to receive charging power from main power supply 12, and to provide pulsed power to pulsed load 14 through switch 16. Pulsed load power supply circuit 10 includes transformer 18, transistor 20, diode 22, and capacitor 24. Pulsed load power supply circuit 10 is connected in a simple "flyback" configuration to provide a large charging voltage to capacitor 24. After pulsed load power supply circuit 10 charges capacitor 24 to a sufficient level, switch 16 is closed, allowing capacitor 24 to discharge through pulsed load 14. Graph 26 illustrates an exemplary embodiment of a pulse pattern applied to selectively open and close switch 16 at a rate of 50 Hertz (Hz). As shown in graph 26, switch 16 is only closed for a short amount of time, allowing a pulse of energy to be supplied to pulsed load 14.

The flyback circuit configuration operates by switching transistor 20 between a conducting and a non-conducting state at a set frequency (e.g., 3 kHz) with a set duty cycle (e.g., 30%). Graph 25 illustrates an exemplary pulsing pattern applied to the base of transistor 20, such that transistor is turned on and off at a frequency of 3 KHz with a duty cycle of 30%. When transistor 20 is in the conducting state, main power supply 12 provides current that flows through the primary windings of transformer 18, resulting in energy being stored to transformer 18. When transistor 20 is switched to the non-conducting state, the polarity of transformer 18 is switched, and energy stored in transformer 18 is transferred through diode 22 to capacitor 24. This cycle of storing energy to transformer 18, and then discharging it to capacitor 24 is repeated at the frequency at which transistor 20 is switched, allowing a large amount of voltage (e.g., 15 kilovolts (kV)) to be stored to capacitor 24 despite relatively small dc voltage provided by main power supply 12. Storing energy to transformer 18 by building up current in the primary winding results in the generation of a high frequency current ripple in main power supply 12 equal to the frequency applied to transistor 20. That is, a high frequency modulated current waveform is drawn from power supply 12 due to the switching of transistor 20. A low frequency current ripple, which requires larger, and therefore more expensive passive elements to filter, is generated by the relatively slow frequency (e.g., 50 Hz) at which power is supplied from main power supply 12 to pulsed load power supply 10. The generation of low frequency current ripple is illustrated and described with respect to FIG. 2. Table 1 below provides values assigned to circuit elements of FIG. 1. These values are used to calculate current ripple effects shown in FIG. 2.

TABLE 1

| CIRCUIT ELEMENT | VALUE |
|---|---|
| MAIN Power Supply 12 | 600 V |
| Transformer 18 | 600 uH - 1:29 turns |
| Transistor 20 | Switched at 3 kHz - Duty cycle of 30% |
| Capacitor 24 | 36 uF (charged to 15 kV) |
| Pulsed Load 14 | Switched at 50 Hz |

Figure 2:
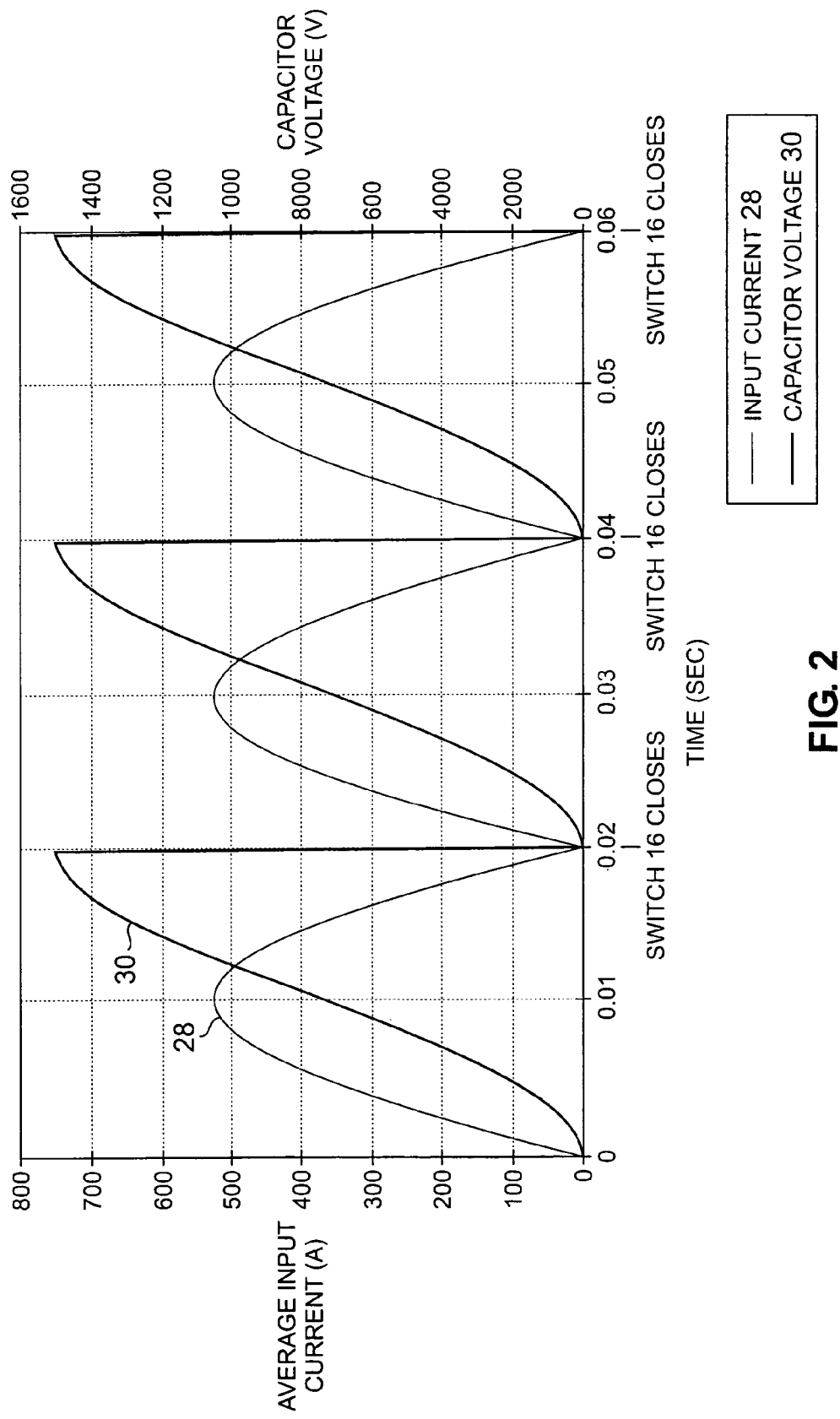
FIG. 2 is a graph illustrating current ripple caused by the pulsed load power supply as known in the prior art.

FIG. 2 illustrates average current (line 28) input supplied from main power supply 12 to capacitor 24 by way of transformer 18, as well as capacitor voltage (line 30) stored to capacitor 24 over a time period of 60 milliseconds (includes three cycles at 50 Hz). Although FIG. 2 represents the average current provided by main power supply 12, the actual input current provided from main power supply 12 at times will be much higher, as discussed in more detail below, due to the combination of high frequency current ripple (not shown) the low frequency current ripple represented by line 28. The low frequency ripple current is discussed first.

At time zero on the circuit waveform graph, power supply 12 begins supplying charging power to capacitor 24. As shown, the average input current increases for approximately 10 milliseconds (ms) to a peak of 524 amperes, at which point the voltage stored on capacitor 24 becomes large enough to cause the average input current to begin decreasing towards zero. At 20 ms, switch 16 is closed, allowing the energy stored to capacitor 24 (approximately 15 kV) to be discharged through pulsed load 14. Switch 16 is then opened, and the charging of capacitor 24 begins again. Because switch 16 is opened and closed at a repetitive rate (50 Hz), the charging of capacitor 24 creates a 50 Hz average current ripple at main power supply 12 as shown by the average input current waveform 28.

To provide perspective, if pulsed load 14 were supplied with the same overall amount of power, but in a fixed, non-pulsed manner, the input current supplied by power supply 12 would only be 333 amperes. Therefore, the low frequency current ripple caused by the 50 Hz cycle time of pulsed load 14 results in a peak average input current of 524 amperes that is much higher than the expected average input current. As discussed above, to filter a low frequency current ripple such as this would require very large passive filter components. The magnitude of the current ripple generated by the circuit shown in FIG. 1 can result in the modulation and disruption of main voltage supply 12, which can cause disruptions to other circuits connected to main voltage supply 12.

Due to the presence of high frequency current ripple, the peak average current of 524 amperes does not represent the actual peak current drawn from main power supply 12 by pulsed load power supply circuit 10. Because the average input current shown in FIG. 2 is the average current through transistor 20 having a duty cycle of 30%, the actual peak current drawn from main power supply 12 would be approximately three times the average peak current of 524 amperes, resulting in a peak current of approximately 1746 amperes. The generation of such large currents requires circuit elements in pulsed load power supply 10 (e.g., transistor 20) to be greatly oversized, and therefore expensive. Therefore, it would be beneficial to reduce the peak current values of the pulsed load power supply system, as well as reducing the ripple current frequencies (high and low) to protect main power supply 12, and reduce the size and cost of filters required to remove the remaining ripple current effects.

Figure 3:
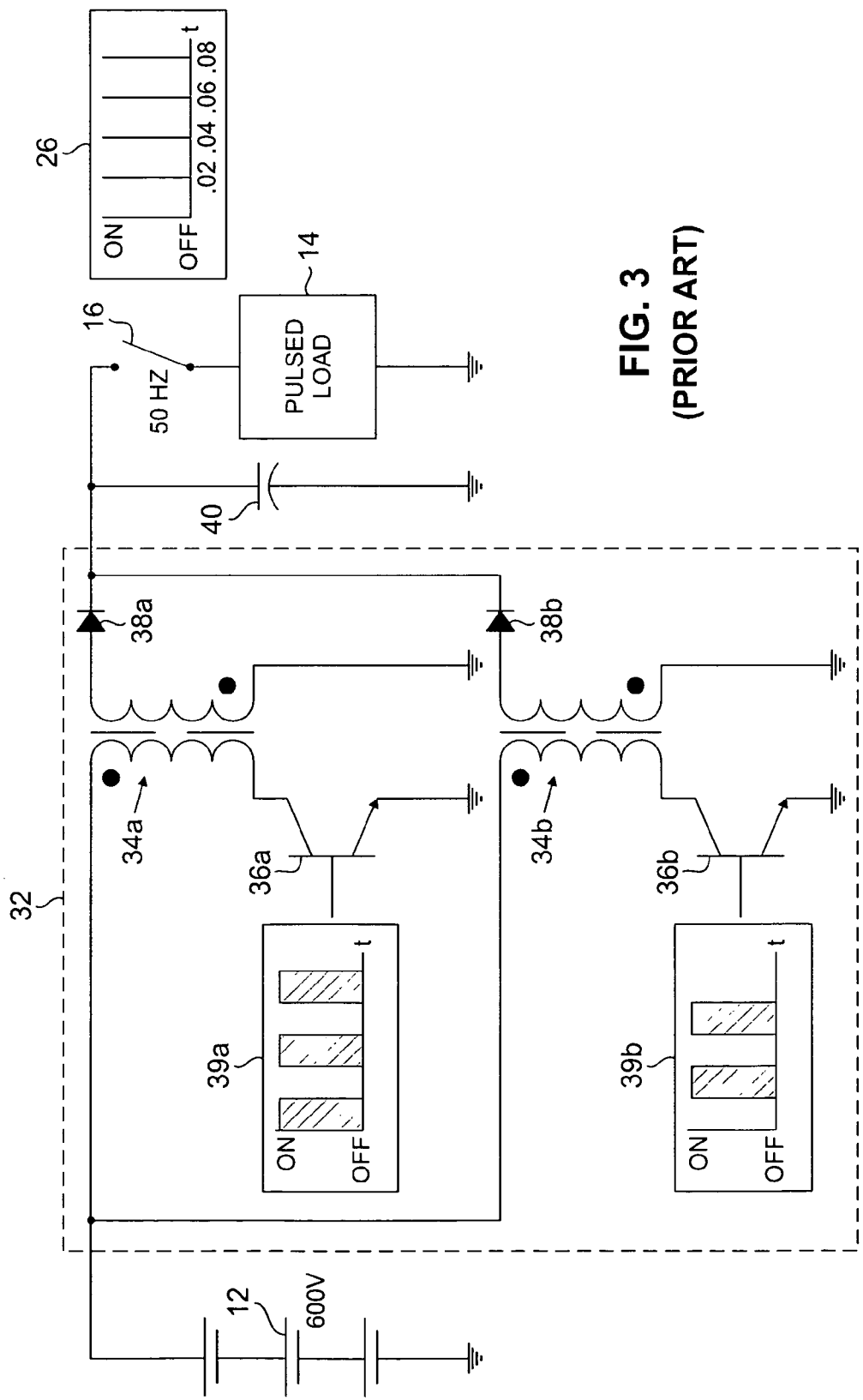
FIG. 3 is a circuit diagram illustrating a high frequency ripple reduction circuit as known in the prior art.

FIG. 3 illustrates a high frequency (HF) ripple cancellation circuit 32 as known in the prior art. The HF ripple cancellation circuit 32 includes transformers 34a and 34b, transistors 36a, and 36b, and diodes 38a and 38b. The HF ripple cancellation circuit 32 is supplied with power from main power supply 12, which it uses to charge output capacitor 40. Pulsed load 14 is connected through switch 16 to receive energy stored to output capacitor 40. The HF ripple cancellation circuit 32 operates in much the same way as the pulsed load power supply circuit shown in FIG. 1. The main difference is the addition of a second transformer 34b for storing and transferring energy from main power supply 12 to capacitor 40 and the change from a 30% duty cycle for transistor 20 of FIG. 1 to a 50% duty cycle for transistors 36a and 36b (The switching frequency of transistors 36a and 36b remains the same)(e.g., 3 KHz).

Switching pattern charts 39a and 39b illustrate the on/off cycle of transistors 36a and 36b. As shown, transistors 36a and 36b operate at a frequency of 3 kHz and have a duty cycle of 50%, but transistor 36b is one half cycle out of phase with transistor 36a, meaning that transistor 36b is only on when transistor 36a is off, and vice versa. Switching transistor 36a on allows current to flow through the primary winding of transformer 34a and transistor 36a to ground. Switching transistor 36a off allows energy stored in transformer 34a to be transferred to capacitor 40 through diode 38a. When transistor 36a is switched off, transistor 36b is switched on, resulting in current being provided to the primary winding of transformer 34b. Switching transistor 36 off (as transistor 36a is switched on again) results in energy stored in transformer 34b being transferred to capacitor 40. The net result of this mutually exclusive switching scheme is power supply 12 is constantly providing input current to either transformer 34a or 34b, reducing high frequency current ripple created when current is intermittently supplied to a single transformer. However, this switching, scheme does not reduce the low frequency current ripple shown in FIG. 2.

Figure 4:
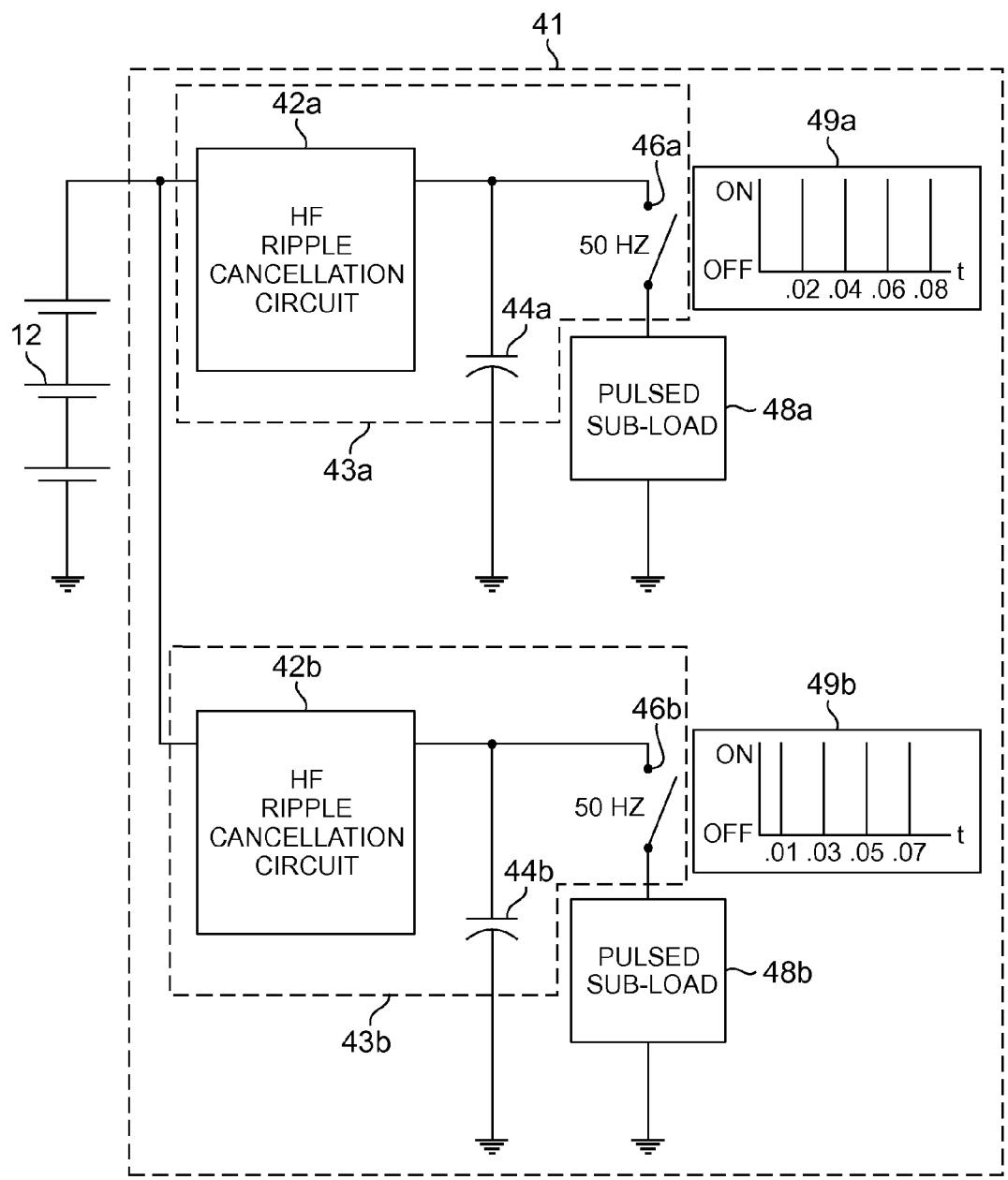
FIG. 4 is a circuit diagram illustrating a frequency (both high and low) ripple reduction circuit of the present invention.

FIG. 4 shows a high frequency (HF) and low frequency (LF) pulsed power source 41 of the present invention, in which power is provided to pulsed power source 41 by main power supply 12. Pulsed power source 41 includes first pulsed load power supply 43a and second pulsed load power supply 43b. First pulsed load power supply 43a includes HF ripple cancellation circuit 42a, capacitor 44a, and switch 46a. Second pulsed load power supply 43b includes HF ripple cancellation circuit 42b, capacitor 44b, and switch 46b. Although two HF ripple cancellation circuits 42a and 42b are shown, alternative charging circuits capable of providing charging energy to capacitors 44a and 44b may be used instead, although high frequency ripple may be introduced and require appropriate filtering.

Main power supply 12 provides input current to HF ripple cancellation circuits 42a and 42b, which in turn provide charging power to capacitors 44a and 44b, respectively. Pulsed power is provided from capacitors 44a and 44b to pulsed sub-loads 48a and 48b, respectively, at a predetermined frequency (e.g., 50 Hz). Dividing the pulsed load into first pulsed sub-load 48a and second pulsed sub-load 48b allows the current being provided by main power supply 12 to be divided into two components for charging capacitor 44a and capacitor 44b. By providing pulses of energy to pulsed sub-loads 48a and 48b out of phase with one another as shown by switching charts 49a and 49b (and therefore providing charging input current to capacitors 44a and 44b out of phase with one another), the low frequency current ripple is reduced as compared with a single pulsed load (discussed in more detail in conjunction with FIGS. 5A-5B).

As shown by switching charts 49a and 49b, pulsed sub-load 48a is pulsed one-half cycle out of phase with pulsed load 48b. For instance, in one exemplary embodiment pulsed sub-loads 48a and 48b are pulsed at 50 Hz. A first pulse of energy is supplied by capacitor 44a to pulsed sub-load 48a at time 0, when switch 46a is closed. A second pulse of energy is supplied by capacitor 44b to pulsed load 48b at time 0.01 ms, when switch 46b is closed. Thus, both pulsed sub-loads 48a and 48b receive pulses of energy at a frequency of 50 Hz, but pulses are provided to pulsed sub-load 48a out of phase (in this case, 180 degrees out of phase) with pulsed load 48b. The average input current provided by main power supply 12 to HF ripple cancellation circuit 42a is out of phase with average input current provided by main power supply 12 to HF ripple cancellation circuit 42b, resulting in reduced low frequency current ripple. Furthermore, as discussed above with respect to FIG. 3, each HF ripple cancellation circuit 42a and 42b acts to eliminate or minimize high frequency current ripple.

Figure 5A:
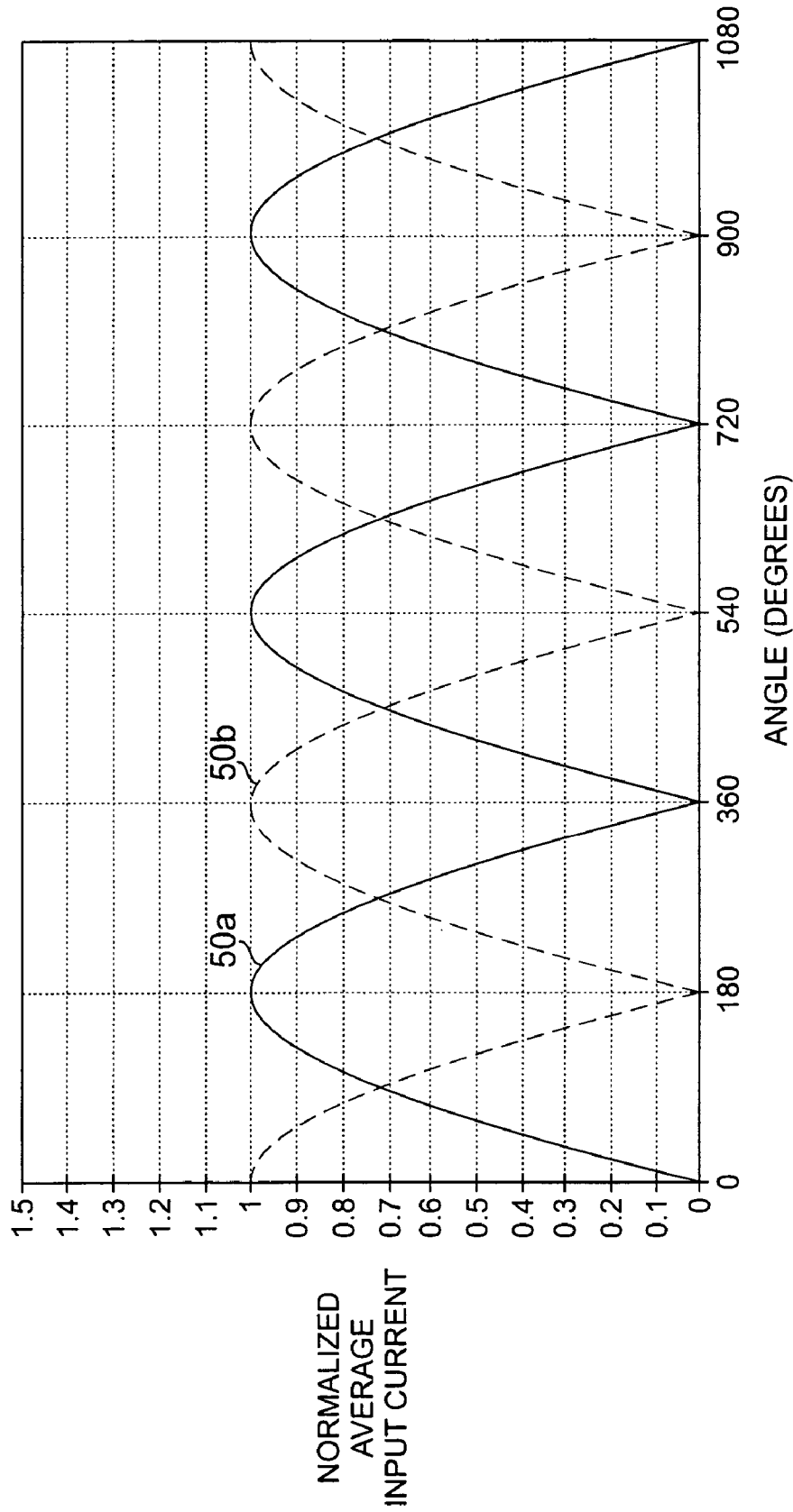
FIGS. 5A-5B are graphs illustrating average input current provided by main power to pulsed load power supply components of the ripple reduction circuit, and resulting average input current provided by the main power supply to the ripple reduction circuit.
Figure 5B:
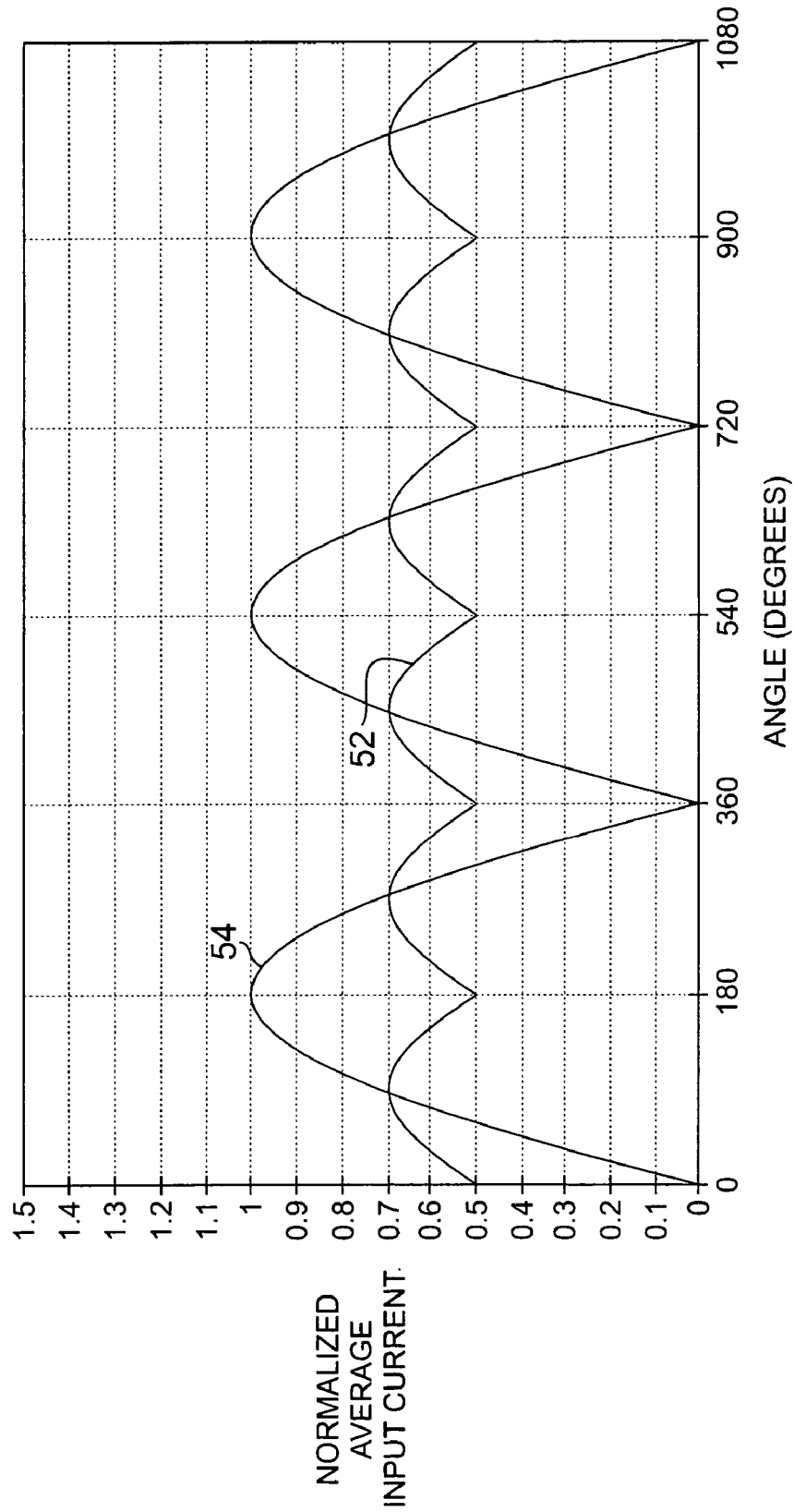

The effect of pulsed power supply 41 on the low frequency current ripple phenomenon is illustrated in FIGS. 5A and 5B. FIG. 5A is a graph illustrating the average input current supplied from main power supply 12 to individual HF ripple cancellation circuits 42a and 42b (represented by lines 50a and 50b, respectively). FIG. 5B is a graph illustrating the composite average current provided by main power supply 12 to pulsed power supply 41, (i.e., combined average current provided to HF ripple cancellation circuits 42a and 42b) represented by line 52. FIG. 5B also provides for the purposes of comparison an average input current (represented by line 54) associated with pulsed load power supply 10 as shown in FIG. 1.

As shown in FIG. 5A, average input current provided by main power supply 12 is normalized such that maximum average input current provided to an individual HF ripple cancellation circuit 42a or 42b is assigned a magnitude of one. The actual average input current provided to HF ripple cancellation circuits 42a and 42b would be less than a system employing a single pulsed load (assuming an equal amount of power being provided to the single pulsed load and the combination of pulsed sub-loads 48a and 48b). This reduces the amount of current each component within HF ripple cancellation circuit 42a and 42b must be rated to accommodate, permitting use of smaller and therefore less expensive components.

As discussed with respect to FIG. 4, pulsed sub-load 48a is supplied with pulses of energy 180° out of phase with pulsed sub-load 48b. Therefore, as shown in FIG. 5A, average input current provided by main power supply 12 to HF ripple cancellation circuit 42a is 180° out of phase with average input current provided by main power supply 12 to HF ripple cancellation circuit 42b. The average input current waveforms 50a and 50b, individually, retain the same average input current waveform (although not necessarily same magnitude) illustrated in FIG. 2 with respect to a single pulsed load.

FIG. 5B shows the composite (total) input current 52 provided by main voltage supply 12 to pulsed power supply 41. Composite input current 52 is obtained by adding the input current provided by main power supply 12 to HF ripple reduction circuit 42a with the input current provided by main power supply 12 to HF ripple reduction circuit 42b. The composite input current 50 is then scaled to take into account that with bifurcated pulsed sub-loads 48a and 48b, only one half of the current is provided to HF rippled reductions circuits 42a and 42b. To compare, FIG. 5B also shows the average input current 54 that would be required if the pulsed load was not divided into pulsed sub-loads 48a and 48b (i.e., if a pulsed load power supply 10 as shown in FIG. 1 were used). Both the composite input current 52 and prior art input current 54 are represented with respect to a scale that provides maximum input current at a value of 1.0. As shown, the magnitude of composite input current 52 varies between 50%-70% of the maximum average current 54 required in the prior art. Furthermore, the frequency of composite input current 52 is twice the frequency of prior art input current 54 of the pulsed load. Thus, the present invention reduces the magnitude of the current ripple while increasing the frequency of the current ripple, which reduces the size and expense of filtering components required to protect the main power supply.

Figure 6:
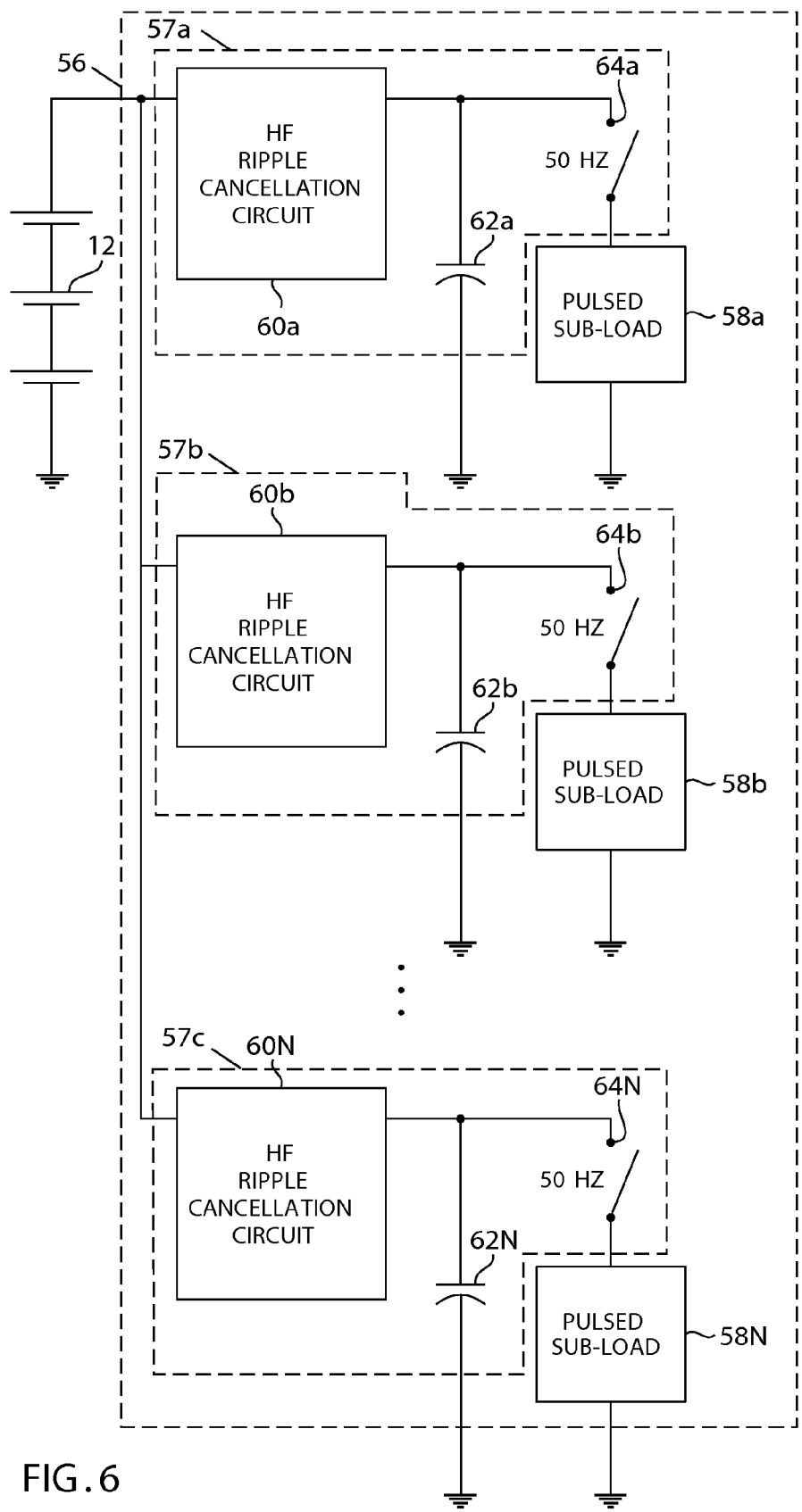
FIG. 6 is a circuit diagram illustrating a frequency ripple reduction circuit of the present invention.

FIG. 6 shows a high frequency (HF) and low frequency (LF) pulsed power source 56 of the present invention. Pulsed power source 56 includes a pulsed load divided into a plurality of pulsed sub-loads 58a-58N, a plurality of HF ripple cancellation circuits 60a-60N, and a plurality of output capacitors 62a-62N. In this embodiment, pulsed power source 56 includes a plurality of pulsed load power supplies 57a-57N, each including a HF ripple cancellation circuit 60a-60N, a capacitor 62a-62N, and a switch 64a-64N, respectively. Although HF ripple cancellation circuits 60a-60N are shown, any type of charging circuit capable of providing charging energy to capacitors 62a-62N could be employed, although high frequency ripple may be introduced and require appropriate filtering.

Main power supply 12 provides input current to HF ripple cancellation circuits 60a-60N, which in turn provide charging power to output capacitors 62a-62N, respectively. Pulsed power is provided from output capacitors 62a-62N to pulsed sub-loads 58a-58N, respectively, at a predetermined frequency (e.g., 50 Hz). Dividing the pulsed load into a plurality of pulsed sub-loads 58a-58N allows the current being provided by main power supply 12 to be divided into a plurality of currents that provide charging power to the plurality of capacitors 62a-62N. By providing pulses of energy to the plurality of pulsed sub-loads 58a-58N out of phase with one another (and therefore providing charging input current to capacitors 62a-62N out of phase with one another), the low frequency current ripple is reduced as compared with a single pulsed load. The number of pulsed sub-loads 58a-58N that the pulsed load is divided into determines the phase difference between pulses. For instance, as discussed with respect to FIG. 4, if the pulsed load is divided into a first pulsed sub-load and a second pulsed sub-load, then the phase difference between pulses is 180°. If the pulsed load were divided into three pulsed sub-loads, then the phase difference between pulses would be 120°, to maintain an equal amount of time between each pulse of energy. This results in the total average input current provided by main power supply 12 to the plurality of HF ripple cancellation circuits 58a-58N having reduced low frequency ripple magnitude while resulting in an increase in the frequency of the low frequency ripple magnitude. Furthermore, as discussed above with respect to FIG. 3, each HF ripple cancellation circuit 58a-58N acts to eliminate or minimize high frequency current ripple.

Although the present invention has been described with reference to preferred embodiments, workers skilled in the art will recognize that changes may be made in form and detail without departing from the spirit and scope of the invention.

The invention claimed is:

1. A pulsed power source for providing pulsed power to a load comprising a plurality of sub-loads, the pulsed power source comprising:
   a plurality of pulsed load power supplies, each pulsed load power supply including a charging circuit and a capacitor, the charging circuit connected to receive power from a main power supply and to provide charging power to the capacitor; and
   a plurality of switches, each switch being connected between the capacitor of one of the plurality of pulsed load power supplies and one of the plurality of sub-loads, wherein each switch is opened and closed at a first frequency and at a different phase with respect to switches connected to other sub-loads to deliver a pulse of power from the capacitor to the pulsed sub-load at a different phase with respect to pulsed power delivered to other sub-loads.

2. The pulsed power source of claim 1, wherein the charging circuit is a high frequency ripple reduction circuit.

3. The pulsed power source of claim 2, wherein the high-frequency ripple reduction circuit includes:
   a first transformer having a primary winding and a secondary winding, wherein the primary winding of the first transformer is connected to the main power supply and the secondary winding of the first transformer is connected to the capacitor; and
   a first power switching device connected to the primary winding of the first transformer, wherein the first power switching device is switched between a conducting state and a non-conducting state at a second frequency to provide charging energy to the capacitor.

4. The pulsed power source of claim 3, wherein the high-frequency ripple reduction circuit further includes:
   a second transformer having a primary winding and a secondary winding, wherein the primary winding of the second transformer is connected to the main power supply and the secondary winding of the second transformer is connected to the capacitor; and
   a second power switching device connected to the primary winding of the second transformer, wherein the second power switching device is switched between a conducting state and a non-conducting state at the second frequency to provide charging energy to the capacitor, wherein charging energy is supplied to the capacitor from the second transformer at a different phase with respect to charging energy supplied from the first transformer.

5. A method of providing energy pulses to a pulsed load, the method comprising:
   providing power from a main power supply to a plurality of charging circuits, each of the plurality of charging circuits associated with one of a plurality of pulsed load power supplies, wherein each pulsed load power supply is connected to a different sub-load of the pulsed load; and
   providing charging power from the plurality of charging circuits to a plurality of capacitors, each of the plurality of pulsed load power supplies including one of the plurality of capacitors connected to receive charging power from the corresponding charging circuit associated with the pulsed load power supply;
   controlling a plurality of switches connected between each of the plurality of capacitors and the plurality of sub-loads, wherein each switch is opened and closed at a first frequency and at a different phase with respect to the other plurality of switches to deliver energy pulses from each of the plurality of capacitors to the sub-loads at a different phase with respect to energy pulses supplied to other sub-loads.

6. The method of claim 5, further including:
   controlling the phase that energy pulses are provided to the sub-loads based on the number of pulsed sub-loads being provided with pulsed power.

7. The method of claim 5, wherein each of the plurality of pulsed load power supplies includes a high-frequency ripple cancellation circuit.

8. The method of claim 7, wherein providing charging power from a main power supply to each of the pulsed load power supplies includes:
   switching a first transistor connected to a primary winding of a first transformer On and Off at a second frequency, wherein energy provided by the main power supply is stored in the first transformer when the first transistor is On and stored energy is provided to charge a first capacitor when the first transistor is Off;
   switching a second transistor connected to a primary winding of a second transformer On and Off at the second frequency, wherein energy provided by the main power supply is stored in the second transformer when the second transistor is On and stored energy is provided to charge the first capacitor when the second transistor is Off; and
   wherein the second transistor is operated out of phase with the first transistor.

9. A pulsed power source for providing pulsed power to a load, the pulsed power source comprising:
   a first pulsed load power supply having a first charging circuit, a first capacitor, and a first load switch connected between the first capacitor and a first sub-load of the load, the first charging circuit connected to receive power from a main power supply and to provide charging power to the first capacitor, the first load switch being opened and closed at a first frequency to provide pulsed power from the first capacitor to the first sub-load at the first frequency; and
   a second pulsed load power supply having a second charging circuit, a second capacitor, and a second load switch connected between the second capacitor and a second sub-load of the load, the second charging circuit connected to receive power from the main power supply and to provide charging power to the second capacitor, the second load switch being opened and closed at the first frequency, but at a different phase than the first load switch, to provide pulsed power from the second capacitor to the second pulsed sub-load of the load at the first frequency, wherein the pulsed power to the second pulsed sub-load is delivered at a different phase with respect to pulsed power delivered to the first pulsed sub-load.

10. The pulsed power source of claim 9, wherein the first charging circuit is a high frequency ripple reduction circuit connected to provide charging power to the first capacitor based on power received from the main power supply.

11. The pulsed power source of claim 10, wherein the first high frequency ripple reduction circuit includes:
   a first transformer having a primary winding and a secondary winding, wherein the primary winding of the first transformer is connected to the main input voltage;
   a first switching device connected to the primary winding of the first transformer, wherein the first switching device transfers energy to the first transformer when in a conducting state and causes energy stored to the first transformer to be transferred to the first capacitor when in a non-conducting state;
   a second transformer having a primary winding and a secondary winding, wherein the primary winding of the second transformer is connected to the main input voltage; and
   a second switching device connected to the primary winding of the second transformer, wherein the second switching device transfers energy to the second transformer when in a conducting state and causes energy stored to the second transformer to be transferred to the first capacitor when in a non-conducting state, wherein the first switching device is switched at a different phase with respect to the second switching device.

12. The pulsed power source of claim 9, wherein the second charging circuit is a high frequency ripple reduction circuit connected to provide charging power to the second capacitor based on power received from the main power supply.

13. The pulsed power source of claim 12, wherein the second high frequency ripple reduction circuit includes:
   a third transformer having a primary winding and a secondary winding, wherein the primary winding is connected to the main input voltage;
   a third switching device connected to the primary winding of the third transformer, wherein the third switching device transfers energy to the third transformer when in a conducting state and causes energy stored to the third transformer to be transferred to the second capacitor when in a non-conducting state;
   a fourth transformer having a primary winding and a secondary winding, wherein the primary winding is connected to the main input voltage; and
   a fourth switching device connected to the primary winding of the fourth transformer, wherein the fourth switching device transfers energy to the fourth transformer when in a conducting state and causes energy stored to the fourth transformer to be transferred to the second capacitor when in a non-conducting state, wherein the third switching device is switched at a different phase with respect to the fourth switching device.

14. The pulsed power source of claim 12 and further comprising:
   a third pulsed load power supply having a third charging circuit, a third capacitor, and a third load switch connected between the third capacitor and a third sub-load of the load, the third charging circuit connected to receive charging power from the main power supply and to provide charging power to the third capacitor, the third load switch being opened and closed at the first frequency, but at a different phase than the first load switch and the second load switch, to provide pulsed power from the third capacitor to a third pulsed sub-load of the load at the first frequency, wherein the pulsed power to the third pulsed sub-load is delivered at a different phase with respect to pulsed power delivered to the first and second pulsed sub-loads.

15. A pulsed power source for providing pulsed power to a load, the pulsed power source comprising:
   a first pulsed load power supply connected to receive charging power from a main power supply and to provide pulsed power to a first sub-load of the load at a first frequency, the first pulsed load power supply further including:
      a first high frequency ripple reduction circuit connected to receive power from the main power supply;
      a first capacitor connected to receive charging power from the first high frequency ripple reduction circuit; and
      a first load switch connected between the first capacitor and the first pulsed sub-load, wherein the first load switch is operated at the first frequency to supply pulsed power from the first capacitor to the first pulsed sub-load at the first frequency;
   a second pulsed load power supply connected to receive charging power from the main power supply and to provide pulsed power to a second pulsed sub-load of the load at the first frequency, wherein the pulsed power to the second pulsed sub-load is delivered at a different phase with respect to pulsed power delivered to the first pulsed sub-load.

16. The pulsed power source of claim 15, wherein the first high frequency ripple reduction circuit includes:
   a first transformer having a primary winding and a secondary winding, wherein the primary winding of the first transformer is connected to the main input voltage;
   a first switching device connected to the primary winding of the first transformer, wherein the first switching device transfers energy to the first transformer when in a conducting state and causes energy stored to the first transformer to be transferred to the first capacitor when in a non-conducting state;
   a second transformer having a primary winding and a secondary winding, wherein the primary winding of the second transformer is connected to the main input voltage; and
   a second switching device connected to the primary winding of the second transformer, wherein the second switching device transfers energy to the second transformer when in a conducting state and causes energy stored to the second transformer to be transferred to the first capacitor when in a non-conducting state, wherein the first switching device is switched at a different phase with respect to the second switching device.

17. The pulsed power source of claim 15, wherein the second pulsed load power supply includes:
   a second high frequency ripple reduction circuit connected to receive power from the main power supply;
   a second capacitor connected to receive charging power from the second high frequency ripple reduction circuit; and
   a second load switch connected between the second capacitor and the second pulsed sub-load, wherein the second load switch is operated at the first frequency to supply pulsed power from the second capacitor to the second pulsed sub-load at the first frequency and at a different phase with respect to power supplied from the first pulsed load power supply to the first pulsed sub-load.

18. The pulsed power source of claim 17, wherein the second high frequency ripple reduction circuit includes:
   a third transformer having a primary winding and a secondary winding, wherein the primary winding is connected to the main input voltage;
   a third switching device connected to the primary winding of the third transformer, wherein the third switching device transfers energy to the third transformer when in a conducting state and causes energy stored to the third transformer to be transferred to the second capacitor when in a non-conducting state;
   a fourth transformer having a primary winding and a secondary winding, wherein the primary winding is connected to the main input voltage; and
   a fourth switching device connected to the primary winding of the fourth transformer, wherein the fourth switching device transfers energy to the fourth transformer when in a conducting state and causes energy stored to the fourth transformer to be transferred to the second capacitor when in a non-conducting state, wherein the third switching device is switched at a different phase with respect to the fourth switching device.

19. The pulsed power source of claim 15 and further comprising:
   a third pulsed load power supply connected to receive charging power from the main power supply and to provide pulsed power to a third pulsed sub-load of the load at the first frequency, wherein the pulsed power to the third pulsed sub-load is delivered at a different phase with respect to pulsed power delivered to the first and second pulsed sub-loads.

* * * * *